Feb. 2, 1965
L. J. KILBOY
3,168,254
METHOD FOR PREPARING THE FUEL COMPONENT
OF AGGLOMERATOR-FEED MIX
Filed Feb. 21, 1963
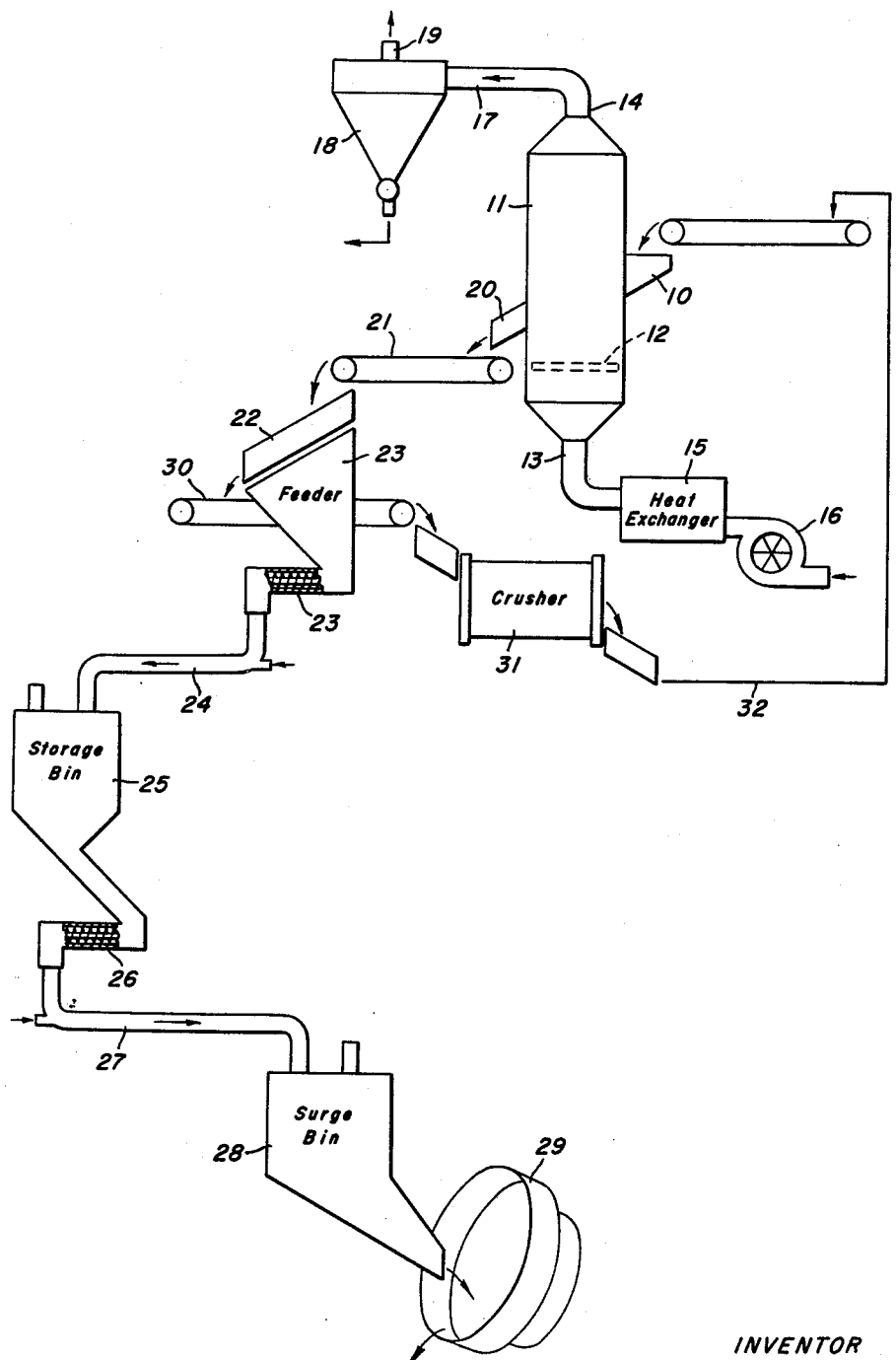
INVENTOR
LAMBERT J. KILBOY
By Donald G. Dalton
Attorney

United States Patent Office 3,168,254
Patented Feb. 2, 1965

3,168,254
METHOD FOR PREPARING THE FUEL COMPONENT OF AGGLOMERATOR-FEED MIX
Lambert J. Kilboy, Worth Township, Cook County, Ill., assignor to United States Steel Corporation, a corporation of New Jersey
Filed Feb. 21, 1963, Ser. No. 260,131
1 Claim. (Cl. 241—19)

This invention relates generally to the beneficiation of fine ore particles by sintering, and more particularly, to the preparation of the fuel component (e.g., coke breeze) charged with water and ore into an agglomerator which feeds pellets to the sintering machine.

Sintering has become almost an essential step preliminary to the reduction of iron ore in the blast furnace. It is now customary, furthermore, to agglomerate the sinter feed into pellets before delivery onto the sintering-machine grate. Coke breeze is the fuel component usually agglomerated with the ore fines but other carbonaceous material may be used. Coke breeze as received from the coke plant contains about 20% of particles small enough to pass through a 100 mesh screen (i.e., 100 mesh in size), which are undesirable for sintering, and a variable amount of moisture which interferes with effective controls operating on a bulk-density basis.

I have invented a method for treating coke-breeze to be used for sinter fuel, whereby the aforementioned difficulties are overcome. In a preferred embodiment and practice, I subject the raw breeze to drying and size classification in a fluidized bed. From the fluidized bed, I remove the fines and take off a certain size fraction for further classification. Following this, breeze of the proper size range is delivered to the agglomerator while oversize particles are further reduced in size by crushing and returned to the fluidized bed.

A complete understanding of the invention may be obtained from the following detailed description and explanation which refer to the accompanying drawing illustrating the present preferred embodiment. The single figure of the drawing is a diagrammatic showing of a system for carrying out my improved method.

Referring in detail to the drawing, coke or other carbonaceous fuel which has been crushed so that it is all smaller than 3/4" in size, is introduced through a side inlet 10 to a fluidized-bed drier 11. The drier comprises a cylindrical tank having a gas-permeable transverse partition 12 near the bottom thereof, gas inlet 13 at the bottom and an outlet 14 at the top. Air at a temperature of from 250 to 375° F. is delivered to inlet 13 from a heat exchanger 15 by a blower 16. The heated air is delivered under pressure sufficient to cause it to filter upwardly through the porous column of breeze in the drier whence off-gases exit through outlet 14. This maintains the column in a fluidized state. The off-gases carry away moisture and particles of a size such that they pass through a 100-mesh screen. The off-gases bearing water vapor and fines are conducted through a bridge pipe 17 to a cylindrical cyclone-type dust collector 18 of a conventional design. Fine particles of coke sink to the bottom of collector 18 for disposition as desired while the gases from dust collector 18 exit through an outlet port 19.

Dried pieces of coke less than 3/4" in size down to that which does not pass through a 100-mesh screen (i.e., +100 mesh in size), leave drier 11 by an outlet 20 and are transported by conveying means 21 to a screen 22. Coke particles smaller than 1/8" in size pass through the screen 22 and are delivered by a feeder 23 to a pneumatic conveyor 24. The latter carries the coke to a storage bin 25 from which a feeder 26 delivers it to a pneumatic conveyor 27. Conveyor 27 maintains a suitable reserve supply of coke in a surge bin 28 which directly feeds coke to an agglomerator 29. The agglomerator forms pellets from ore and water fed thereto from sources not shown and coats them with the coke particles ranging in size from less than 1/8" to a size which does not pass through a 100-mesh screen (i.e. —1/8" to +100 mesh size).

Coke pieces of a size between 1/8" and 3/4" do not pass through screen 22 but are delivered thereby to a conveyor 30 which feeds a crusher 31. The oversize fraction is therein reduced in size and is transported by a conveyor 32 to inlet 10 of drier 11 for recycling.

The advantages of the system of my invention are that it supplies dried coke or other carbonaceous fuel of the limited size range which is particularly desirable for sintering, i.e., from —1/8" to +100 mesh. This avoids the poor distribution of fuel in the sinter feed which results from the presence of larger particles and eliminates the —100 mesh fraction which has no tangible calorific value. Drying of the coke permits its full fuel value to be utilized in sintering.

Although I have disclosed herein the preferred practice of my invention, I intend to cover as well any change or modification therein which may be made without departing from the spirit and scope of the invention.

I claim:

A method of preparing carbonaceous fuel for use as a component of an agglomerate with ore fines for sintering which comprises introducing such fuel ground to a size less than 3/4" and containing particles of —100 mesh in size into a drier, passing hot gases through the fuel thereby removing moisture and fines of —100 mesh size therefrom, passing the off-gases from said dried through a dust collector, removing remaining fuel from 3/4" to +100 mesh in size from said drier and classifying it into a size range smaller than 1/8" suitable for sinter-feed agglomerate and an oversize fraction between 1/8" and 3/4", then crushing the oversize fraction and recycling it through said drier.

References Cited in the file of this patent
UNITED STATES PATENTS 2,310,005 Wilson _____ Feb. 2, 1943
2,430,085 Spencer _____ Nov. 4, 1947